United States Patent [19]

McArdle

[11] Patent Number: 4,903,411

[45] Date of Patent: Feb. 27, 1990

[54] METHOD FOR DETERMINING TYPE SIZE

[76] Inventor: William S. McArdle, 20 Snyder Ave., Ramsey, N.J. 07446

[21] Appl. No.: 280,560

[22] Filed: Dec. 6, 1988

[51] Int. Cl.⁴ ........................................ G01B 3/00

[52] U.S. Cl. ........................ 33/430; 33/DIG. 9; 33/663; 33/452

[58] Field of Search .................. 33/DIG. 9, 1 K, 1 G, 33/403, 430, 663, 1 BB, 452, 464

[56] References Cited

U.S. PATENT DOCUMENTS

| | | |
|---|---|---|
| 431,692 | 7/1890 | Gillis . |
| 972,528 | 10/1910 | Halloran . |
| 1,354,977 | 10/1920 | Kammeyer . |
| 2,376,811 | 5/1945 | Rigby . |
| 4,446,192 | 8/1984 | Ager . |

FOREIGN PATENT DOCUMENTS

| | | | |
|---|---|---|---|
| 1039402 | 5/1953 | France ........................... | 33/DIG. 9 |

OTHER PUBLICATIONS

Photostatic Copy of Proportion Scale.
Photostatic Copy of Service Engravers Typesize Finder Brochure.

*Primary Examiner*—Harry N. Haroian
*Attorney, Agent, or Firm*—Mary A. Whiting

[57] ABSTRACT

The present invention relates to the field of typography. In this field, it is desirable to quickly and efficiently determine certain key ratios between cap height and type size of a letter in a particular typeface, in order to create various aesthetic results. In situations where variations in typeface height normally cause problems, such as: matching specimens of typeface; filling vertical spaces; and dropping caps, among others, the task of determining this ratio is complicated by the fact that typefaces with the same point size may actually differ in height, and typefaces of the same name may vary in size according to the typesetting system which produces them. In such situations, the instant invention is particularly useful. In use, the present invention allows the typesetter, by aligning the device with the cap in accordance with the method of the present invention, and knowing two out of the following three measurements (index number, point size, and cap height) to correlate them so that the third measurement will be instantly available. Once the degrees of the index number is known, various functions such as sizing type, filling a vertical space etc., can be performed using the method of the present invention. The sequence of steps of the present invention may change, depending on the measurement that needs to be determined. However, the individual steps remain the same, whether the index number, cap height or point size is the measurement that needs to be determined.

34 Claims, 4 Drawing Sheets

METHOD FOR DETERMINING TYPE SIZE

The present invention relates to a method and/or device wherein if two out of the following three measurements are known (point size, cap height and index number) the third measurement can be determined.

The device consists of a square base means which has a x axis and a y axis (measured in points) inscribed on the edges of its lower surface (the surface in contact with the material. upon which the letter to be sized is printed); a square cover means, which has an arc, measured in degrees, inscribed on its lower surface (the surface in contact with the base means); a "right-angled" aligning means, which "arms" are at right angles to one another; and a needle means.

The inner edges of said "arms", which are the edges nearest to the x and y axes of the base means, and which are parallel to the x and y axes of the base means, have a line inscribed offset from and parallel to said inner edges.

The measurement that needs to be determined (whether cap height, point size or index number), can be determined by using the method of the present invention. If the point size and cap height of the letter (cap are known, the index number of the letter (cap) can be determined by the method described below.

The x axis of the device is aligned directly over the cap (letter), wherein the base of the cap intersects the x axis, and the apex (top) of the cap intersects the line offset from and parallel to the inner edge of the aligning means, which is perpendicular to the y axis. The y axis intersect of said line corresponds to the cap height measured in points.

Once the device is so aligned, the aligning means of the device is moved by the user so that its edges remain perpendicular to the x and y axes of the base means. The point of intersection of the x axis and the line offset from and parallel to the inner edge of the aligning means (which is perpendicular to the x axis), corresponds to the point size of the cap.

When the aligning means in is this position, the needle means of the device will automatically intersect the arc inscribed on the lower surface of the cover means at a point corresponding to the index number (i.e., the angular polar coordinates measured in degrees.) Once the index number is known, various functions such as sizing type, filling a vertical space, among others, can be performed using the method of the present invention. Thus, when the device is aligned with the cap as described above, the device will correlate the graphic relationship between the index number, the point size and the cap height of the letter.

The above-mentioned sequence of steps is utilized to find the index number when the cap height and point size are known. If either the cap height or point size need to be determined, the sequence of steps will change, but the individual steps and method remains the same.

Heretofore, the usual method for sizing type has been to compare a given typeface sample with the representative letters from various typeface alphabets which are printed on sheets of acetate. Since the range of typefaces represented on these sheets are limited to the range of type in common use, a large number of typefaces in current use are not represented on these sheets. Therefore, a major problem which typesetters face concerns not being able to produce a letter of a specific size from a given face.

Additionally, the use of proportion wheel devices has been a method/device for sizing type. However, the most common use of the proportion type wheel is for scaling graphic objects such as photographs to fit a particular space. Type has not traditionally been thought of in terms of percentages, although this would certainly be a useful way to think of the various typefaces and styles. The proportion wheel would allow one to correlate all sizes and cap heights for a given face if one simply knew the percent relationship between cap height and point size for that face.

For instance, most Futura typefaces have cap heights of 54 to 72 point size. This works out to be 75% and a typesetter could set the proportion wheel to that and have a complete set of readings. Proportion wheels are rarely used, since the process of using them is awkward, and typefaces are simply not thought of in these terms. A surprising number of typesetters in the business simply use the rule of thumb cap height equals $\frac{3}{4}$ point size. and are aware only that certain faces are small" and/or hard to measure.

Prior art devices which are concerned with measuring and gauging type or printed matter are exemplified by the following U.S. Pat. Nos.:

| | | |
|---|---|---|
| B. W. GILLIS | No. 431,692 | July 8, 1890 |
| A. H. HALLORAN | No. 972,528 | October 11, 1910 |
| I. F. T. RIGBY | No. 2,376,811 | May 22, 1945 |
| C. T. KAMMEYER | No. 1,354,977 | Oct. 5, 1920 |
| V. B. AGER | No. 4,446,192 | Aug. 21, 1984 |

U.S. Pat. No. 431,692 issued to B. W. Gillis on July 8, 1890 discloses a device or method of measuring or ascertaining the numbers of ems in duplicate which can be ascertained at a glance, without necessitating a second measurement with rods.

U.S. Pat. No. 972,528 issued to Halloran on Oct. 11, 1910 discloses a device for the measurement of rectangular areas whereby the number of ems in a column may be instantly determined by superimposing the device on the type or printed matter.

U.S. Pat. No. 1,354,977 issued to Kammeyer on Oct. 5, 1920 discloses a device for measuring compositor's duplications whereby the scale is read from the bottom upward, so that the measurement of the duplicates are always exposed to view, and no reimbursements are necessary.

U.S. Pat. No. 2,376,811 issued to Rigby on May 22, 1945 discloses a type size and space gauge which is laid over the work.

U.S. Pat. No. 4,466,192 issued to Ager on Aug. 21, 1984 discloses a method of enhancing the production of typeset runarounds and facilitate the production of a void of particular size and configuration within the text, such void being employed to accommodate graphic induced therein such as a diagram or other figure.

None of the above mentioned references show use of a method and/or device as disclosed in the present invention whereby the typesetter, by knowing two out of the following three measurements (point size, cap height and index number) can quickly and accurately determine the third measurement, with a minimum of steps and manual manipulation.

Additionally, the instant device differs from the proportion wheel type devices/methods in that the instant invention allows for one-step operation; measuring and reading in the method employed by the present invention are not distinct processes as they are in the proportion wheel devices. This allows for significantly faster sizing of type since concentration can be more easily attained and less physical manipulation of devices is necessary.

With proportion wheel type devices, a measurement must be recorded or remembered before a reading can be obtained. The instant device works directly with the height of the cap. The point size can be obtained directly by reading the index number directly from the point of intersection of the indexer needle portion of the device and the arc (measured in degrees.)

Furthermore, the proportion wheel type devices are circular and must be rotated for easy reading, which is an awkward process, whereas the instant invention maintains a perpendicular relation to the cap which corresponds to the common working position of typography. Additionally, the scale on the instant device is uniform, i.e., the increments do not change, whereas on the proportion wheel type devices change of necessity.

Therefore, the instant device results in less likelihood of error than the proportion wheel. For example, from one to two (measures of percent of original size) on the proportion wheel takes up almost 45 degrees of a circle, whereas 70 to 80 (measures of percent of original size) takes up less than a quarter of that distance; hence from 70 to 71 (in percent) would be more than 40 times smaller a distance than from 1 to 2 (in percent); while the present invention can directly use the linear relationships which measure the letters without translating these measurements into a segment of an arc. This reduces the likelihood of error.

OBJECTS OF THE INVENTION

Accordingly, it is the principal object of the present invention to be able to point size, match a sample, fill a vertical space, determine cap height, index a typeface for use with this present invention, or drop a cap without the employment of laborious, time consuming and inaccurate methods.

Another object of the present invention is to provide for a device and/or method which employs means which are simple in construction and which are relatively inexpensive to produce.

A further object of the invention is to provide for a portable device which can be stored easily on one's person or carried in one's briefcase, and further, be constructed sturdily enough so that the device will not easily bend, fold or be misshapen during transport and use.

DESCRIPTION OF THE PREFERRED EMBODIMENT OF THIS INVENTION

Figure 1:
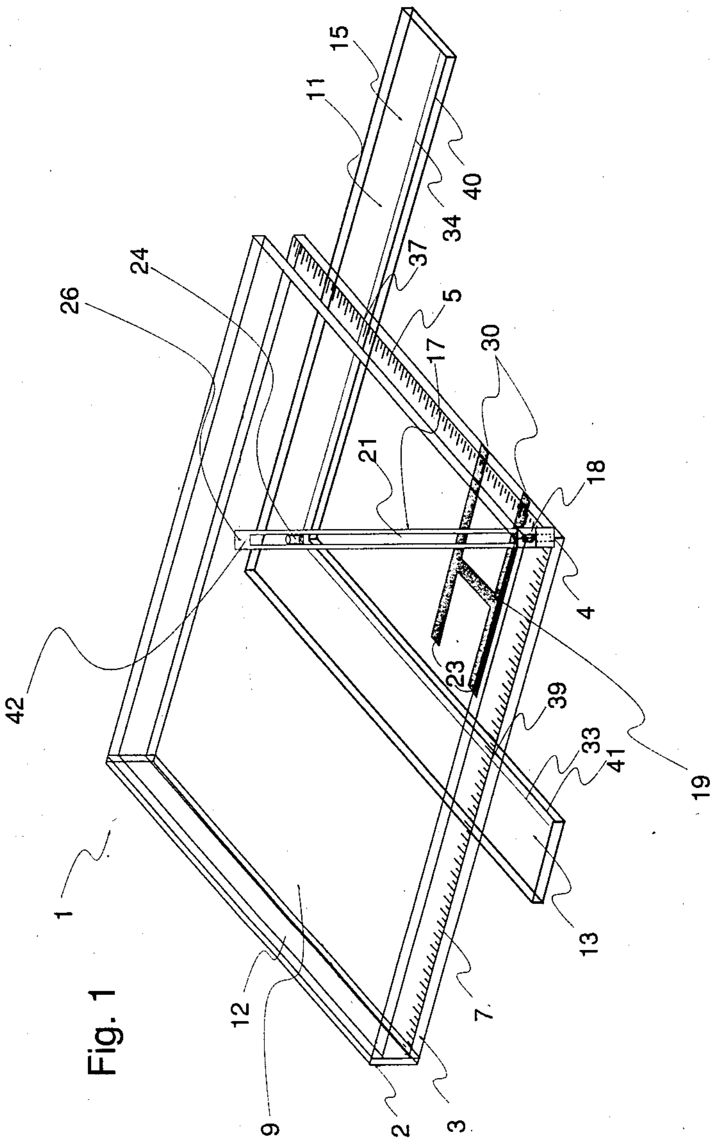
FIG. 1 illustrates a perspective view of the invention showing the respective positions of the transparent base means which is inscribed with an x and y axis, a transparent cover means which is inscribed with an arc, a transparent aligning means which is inscribed with a line offset from and parallel to its inner edges and a needle means, during utilization of the method of the present invention, wherein the letter "H" is shown positioned beneath the device.

FIG. 1. illustrates a perspective view of the preferred embodiment of the device constructed in accordance with the principles of the present invention which embodies a "square-shaped" transparent base means 3 and cover means 2, a "right-angled" aligning means 11, and a needle means 17. Said cover means and base means comprise a pair of vertical edges and horizontal edges (and further comprising an upper and lower horizontal edge and left and right vertical edge) said edges being at right angles to each other. As shown in FIG. 1 and further shown in FIG. 2, the base means 3 has an x axis inscribed on its horizontal edge 5, and an y axis inscribed on its vertical edge 7.

Figure 4:
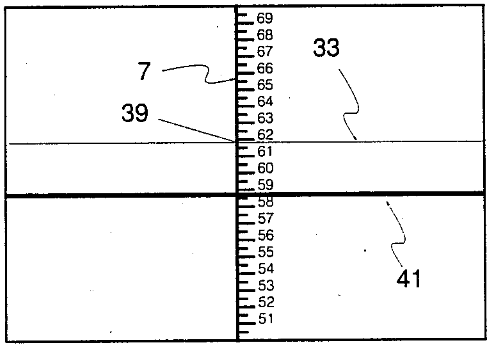
FIG. 4 illustrates an enlarged view of the y axis intersection of the aligning means with the base means.
Figure 6:
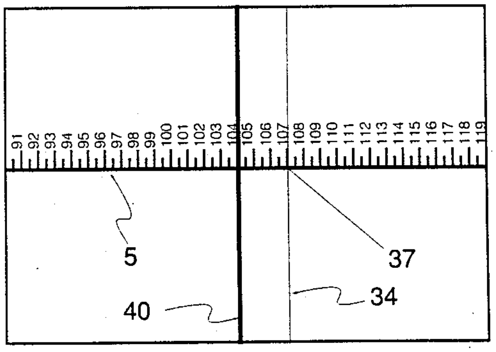
FIG. 6 illustrates an enlarged view of the x axis intersect of the aligning means with the base means.

More specifically illustrated in FIG. 6, the scale inscribed on the lower horizontal edge 5 (x axis) represents increments of one/half point corresponding to the point size of the letter to be sized. As shown in FIG. 4, the scale inscribed on the left vertical edge 7 (y axis) represents increments of one/half point corresponding to cap height of the letter to be sized. The scales inscribed on the x and y axes, 5 and 7, respectively, comprise consecutive points in one/half point increments of a preferred range from 0 to 210 points.

Figure 2:
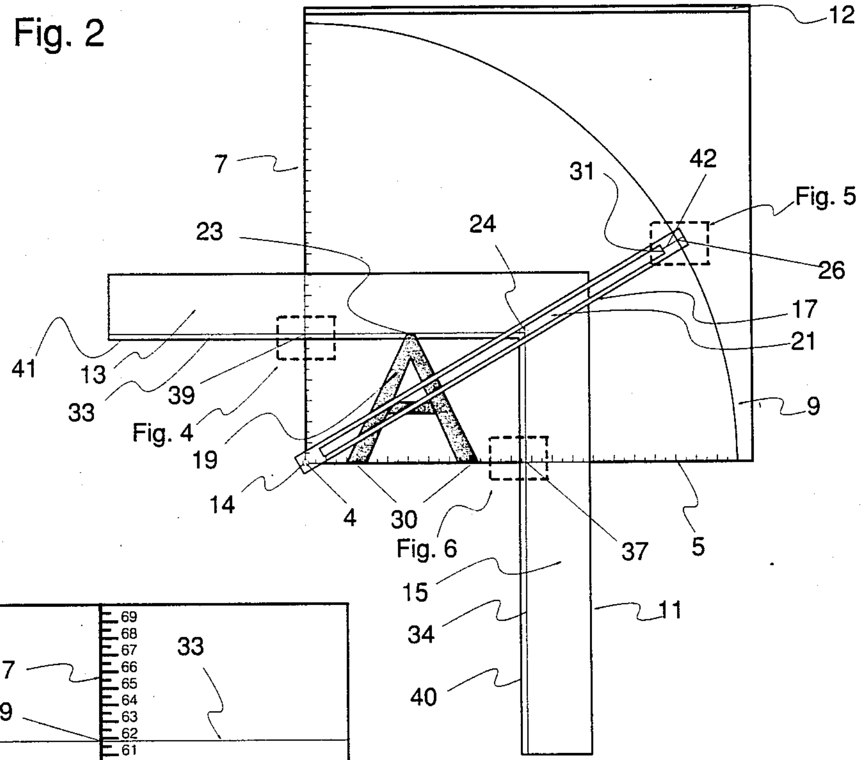
FIG. 2 illustrates a planar geometric view of the invention showing the respective positions of the transparent base means, cover means, aligning means and needle means, wherein the letter "A" is shown positioned beneath the device, and further showing the x axis and y axis inscribed on the base means, the arc inscribed on the cover means, and the line inscribed offset from and parallel to the inner edge of the aligning means.

Also shown in FIGS. 1 and 2, is the cover means 2 which has an arc 9 inscribed thereon which intersects the x axis 5 and the y axis 7 of the base means 3 at the 209 point measurement.

Figure 5:
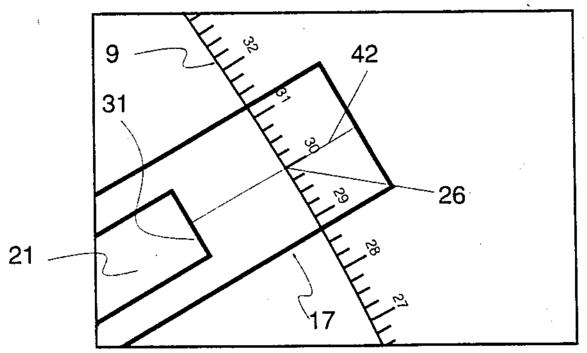
FIG. 5 illustrates an enlarged view of the intersection of the needle means with the arc inscribed on the cover means.

As shown enlarged in FIG. 5, arc 9 comprises a scale having increments of one degree corresponding to the index number of the letter to be sized, said scale comprising consecutive numbers of a preferred range between 25–40 degrees (with increments of one-fourth of a degree.)

As shown in FIG. 2, when described in planar geometric terms, said horizontal edge 5 corresponds to the x axis and said vertical edge 7 corresponds to the y axis, point 4 being the vertex and polar coordinate (0,0) of the planar geometric relationship of the x and y axes, and arc 9 having radii of 209 points.

As shown in FIG. 1, an aligning means 11 is slidably moveable between the base means 3, and the cover means 2, and is held in place between both base means 3 and cover means 2 in a stationary position when not in use by the sufficiently tight fit of the cover means 2 against the base means 3.

Figure 3:
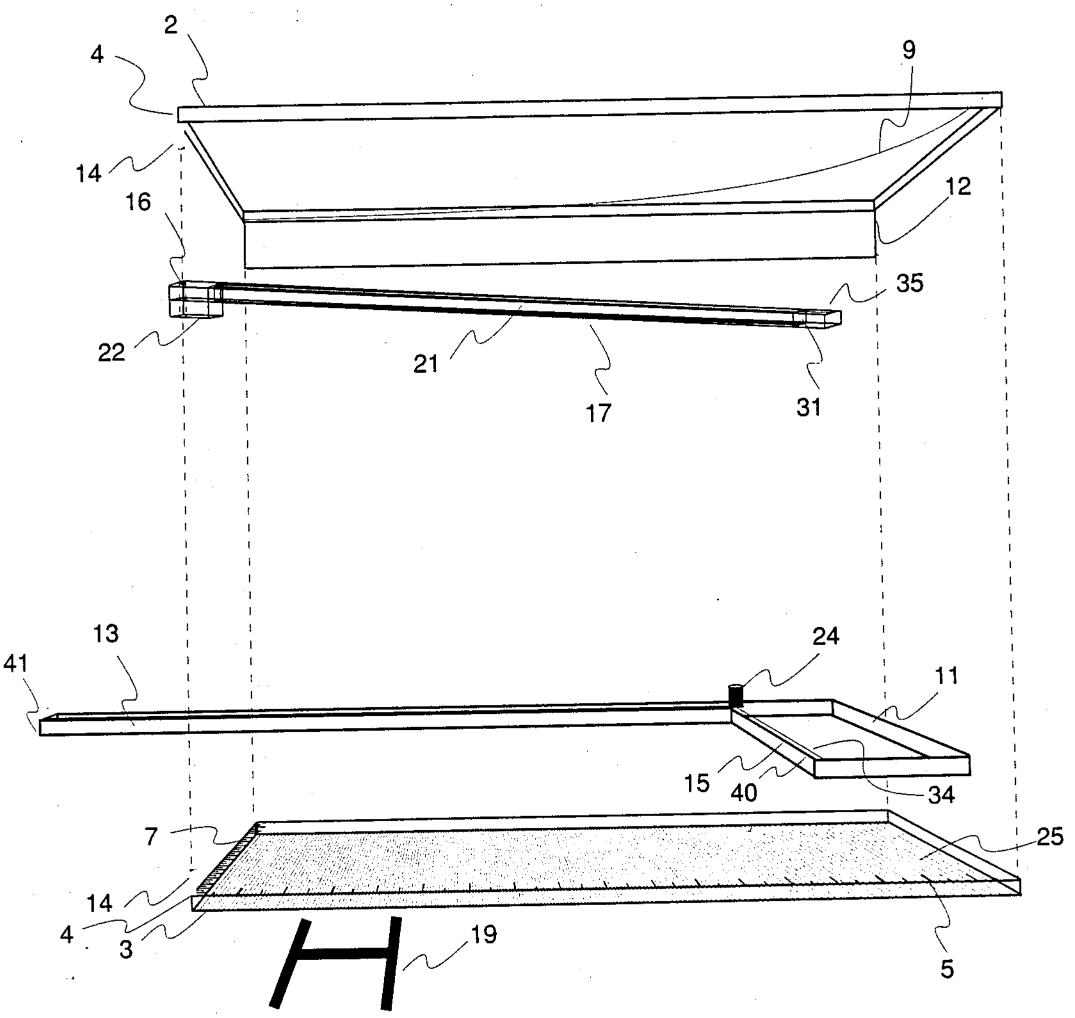
FIG. 3 illustrates a perspective exploded cross-sectional view of the invention showing the spatial relationship between the base means, aligning means, needle means and cover means, and further showing the vertical pattern inscribed on the base means, wherein the letter "H" is shown positioned beneath the device.

As shown in FIG. 3, a needle means 17 is fixably rotatably attached to the base means 3 and cover means 2 by a common pin means 14. In FIG. 3 this pin means 14 is shown fragmented. When the present invention is used, this pin means 14 is solid and is pierced through the shaft portion 16 of the needle means, and is molded to and protrudes from the edges of the cover means 2 and base means 3 at the vertex 4.

Figure 7:
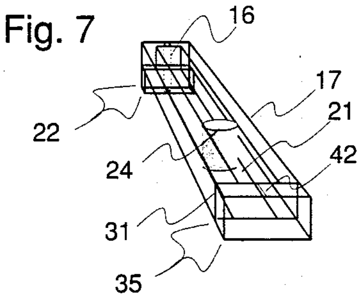
FIG. 7 illustrates a perspective view of the groove portion of the needle means and its spatial relationship with the tab portion (shaded) of the aligning means; and further showing the shaft portion of the pin means (in phantom).

Also shown in FIGS. 3 and 7, the needle means 17 is slidably attached to aligning means 11 when the tab portion 24 of the aligning means 11 slides in the groove portion 21 of the needle means 17. This provides for automatic perpendicular alignment of the needle means 17 with the arc 9 inscribed on the cover means 2, when the aligning means 11 is moved between the base means 3 and the cover means 2.

Also shown in FIG. 3, tab portion 22 of the needle means 17, which is fixably attached or molded to the needle means 17, is the same thickness as aligning means 11 0.0568 inches.) This allows for horizontal alignment of the needle means 17 on top of the aligning means 11 which, in turn, reduces the likelihood of error in reading the measurement of the index number on arc 9 (in degrees.)

The fit of the pins means 14 within the shaft portion 16 of the needle means 17 is sufficiently tight so as to allow for movement of the needle means 17 within the control of the user, and does not allow for loose swinging movement of the needle means 17. As shown in FIGS. 3 and 7, the wall portion 31 located at the tip portion 35 of the needle means 17, acts as a stop which tab portion 24 abuts against. In the preferred embodiment of the invention, the tip portion 35 of the needle means 17 is constructed of a solid plastic and is 0.0512 inches thick, 0.1620 inches long, and 0.12 inches wide.

FIGS. 1, 2 and 5 illustrate that the center hairline 42 of the needle means 17 will perpendicularly intersect arc 9 at point 26 when the aligning means 11 is slidably moved between base means 3 and cover means 2. Arms 13 and 15 of the aligning means 11 and the lines 33 and 34 inscribed offset from and parallel to the inner edges 41 and 40 of said arms 13 and 15, respectively, maintain a perpendicular alignment to the x axis 5 and the y axis 7 of the base means 3.

This relationship is shown in detail in FIG. 5. The center hairline 42 of the needle means 17 will intersect arc 9 at a point 26 which corresponds to the index number (in degrees) of the cap. The common range of index numbers along arc 9 is 25–40 degrees.

The index number is defined as the ratio of cap height to point size for any given typeface, expressed as the angular polar coordinate of pair x, y. The x axis intersect at point 37 corresponds to type size, and the y axis intersect at point 39 corresponds to the cap height.

A conventional loupe of magnification power of at least six times and ranging between six and eight power may be placed over the intersection point 39 of the needle means 17 with the arc 9 in order to facilitate an accurate reading of degrees.

As shown in FIGS. 1 and 3, in order to facilitate a sturdy construction, panel portion 12 is permanently affixed (or molded) onto the cover means 2 and base means 3. This stationary panel portion 12 facilitates sturdy construction and keeps the cover means 2 and base means 3 evenly aligned during transit and use.

The dimensions of the base means 3 and cover means 2 is preferably a 3 inch square which is 0.0578 inches thick. The arms 13 and 15 of the aligning means 11 are preferably 3.2638 inches long, 0.0568 inches thick, and 0.4475 inches wide. The lines 33 and 34 are offset from the inner edges of the aligning means 41 and 40, respectively, by 3.5 points (0.0463 inches) and are 0.15 points 0.0019 inches) thick. The cylindrical tab portion 24 of the aligning means 11 is 0.055 inches thick and 0.06 inches in diameter. Said needle means 17 is preferably 3 inches long, 0.12 inches wide, and 0.056 inches thick; its groove portion 31 is 0.0617 inches wide and 0.055 inches thick. The tab portion 22 of the needle means 17 is 0.1543 inches long, 0.12 inches wide, and 0.1134 inches thick. Equal thickness (depth) of the tab portion 22 and the aligning means 11, allows for horizontal alignment of the needle means 17 on the aligning means 11 during utilization of the present invention. The panel portion 12 of the cover means 2 is preferably 0.1706 inches high, 0.0578 inches thick, and is the same length as the cover means 2 and base means 3 (3 inches long.)

Said base means 3, cover means 2, and aligning means 11 are constructed of a smooth transparent material, preferably a clear acetate sheet. However, they can be composed of other plastic material. Said clear, smooth material allows the user to easily see through the base means 3 and cover means 2 and easily slide the aligning means 11 between the surface of the base means 3 and cover means 2.

As shown in FIG. 3, in the preferred embodiment of the invention, the base means 3 has a pattern 25 of vertical parallel lines distanced one point apart, of a thickness of 0.15 point inscribed thereon to insure that arms 13 and 15 and lines 33 and 34 which are offset from and parallel to inner edges 41 and 40 of said aligning means 11 are kept perpendicular to the y and x axes inscribed on edges 7 and 5 of the base means 3, respectively.

Alternatively, the base means 3 and the aligning means 11 are constructed of polarizing material, so the aligning means 11 can be aligned with the base means 3 to insure arm 15 and arm 13 of said aligning means 11 are kept perpendicular to the x and y axes inscribed on edges 5 and 7, respectively, of the base means 3. The minimum polarizing effect is achieved by aligning the polarizing material of said aligning means 11 and said base means 3 parallel to each other.

As shown in FIG. 3 and shown in detail in FIG. 7, said needle means 17 has an elongate groove 21 running along its length. The tab portion 24 of aligning means 11 fits snugly into said grove 21, so that, when the aligning means 11 is moved between the base means 3 and cover means 2, tab portion 24 of the aligning means 11 moves along groove 21. The needle means 17 is fixably rotatably attached to the base means 3 and cover means 2 by means of a pin 14. Pin means 14 fits through shaft portion 16 of the needle means 17. Pin means 14 is a conventional pin which is attached to the base means 3 and cover means 2 at vertex 4. Alternately, pin means 14 is constructed of plastic and is molded onto the base means 3 and cover means 2 at vertex 4.

Thus, as shown in FIGS. 1 and 2, when the aligning means 11 is moved between the base means 3 and cover means 2, the needle means 17 maintains its right angle intersect with arc 9, and arms 15 and 13 of the aligning means 11 remain perpendicular to the x and y axes, respectively, of the base means 3.

The present invention can be employed to determine the index number of a cap in degrees, if [it is]not yet known. Once this index number is known, further steps in the present method of the invention are employed to determine other needed measurements of a cap.

The following example of the method of the present invention is for measurements: cap height (62 points), point size (107 points), and index number (30 degrees). To determine the index number (in degrees) as shown in FIG. 2, the following steps are employed: the device 1 is placed over the letter (cap) 19 and after placement, aligned with the cap 19 whereby the base 30 of the cap 19 intersects the x axis 5 of the base means 3, and apex (top) 23 of the cap 19 intersects the line 33 inscribed parallel and offset from inner edge 41 of arm 13 of the aligning means 11 which is perpendicular to the y axis 7 of the base means 3 at intersection point 39. Once so aligned, as shown enlarged in FIG. 4, point 39 corresponds with the cap height (62 points) of the cap 19.

The aligning means 11, is then slidably moved over the base means 3. Keeping edge 15 of said aligning means 11 perpendicular to the x axis 5 of the base means 3; said aligning means 11 is moved along the base means 3 until the line 34 inscribed offset from and parallel to the inner edge 40 of the aligning means 11 intersects the x axis 5 at intersection point 37. Enlarged and shown in FIG. 6, point 37 corresponds to the point size of cap 19 (107 points).

Once so aligned, as shown enlarged in FIG. 5, the hairline 42 of the needle means 17 will intersect arc 9 of the cover means 2 at point 26 corresponding to the index number of that cap 19 (30 degrees). The common range of index numbers along arc 9 is from 25–40 degrees.

As illustrated in FIG. 2, the present invention can be employed to determine the cap height (in points) of a typeface if the index number has been determined and the point size of that typeface is known. In order to determine the cap height, the needle means 17 is aligned along arc 9 so that point 26 corresponds to the index number (in degrees) of that specific typeface; fixing the needle 17 at point 26, said edge 15 of the aligning means 11 is moved perpendicularly along the x axis 5 of the base means 3 until the x axis 5 intersects line 34 at point 37, which corresponds to the point size (in points.) The y axis 7 intersect 39 (the point at which line 33 perpendicularly intersects the y axis 7 of the base means 3), will equal the exact cap height (in points) of that cap in a specific typeface.

In order to determine the point size, the device is placed over the cap 19 to be sized, and after placement, aligned with the cap 19 whereby the points located on the base 30 of the cap 19 intersect the x axis 5 of the base means 3, and the points located on the apex 23 of the cap 19 intersect line 33 of the aligning means 11, whereby the line 34 intersects the x axis 5 of the base means 3 at the point of intersection 37. Once so aligned, as shown in FIG. 2, point 39 corresponds with the cap height in points of the cap 19.

By fixing line 33 at this intersect point 39, and then moving the needle means 17 along arc 9, the intersection point 26 of the needle means 17 and arc 9 will correspond to the index number (in degrees) for that cap's specific typeface. The intersection of line 34 and the x axis 5 of the base means 3 at point 37 will equal the point size of the cap (in points).

Figure 8:
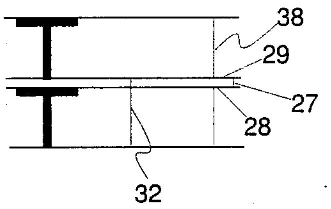
FIG. 8 illustrates the white space between the bottom of one line of caps and the top of the row beneath.

As shown in FIG. 8, yet another use of the method of the present invention is to "fill a vertical space" of a specific cap height (in points). In layman's terms, to "fill a vertical space" is the procedure whereby the typesetter determines what particular point size of the cap is necessary to make the letter as high as the known vertical space 38. Said vertical space 38 is equivalent to the cap height 39 (in points.) Therefore, to "fill a vertical space", once the index number in degrees and the point size in points of the space to be filled is determined, the above-mentioned method of determining the cap height in points is utilized.

FIG. 8 demonstrates that the y axis intersect (point 39 in FIG. 2) corresponds, when measured in points, to the vertical space 38. As shown in FIG. 2, line 33 of the aligning means 11 intersects the y axis 7 of the base slab means 3 perpendicularly at a point 39. Also shown in FIG. 2, point 39 corresponds to the cap height (in points) of the vertical space 38 to be filled. Keeping arm 15 of the aligning means 11 perpendicular to the x axis 5 of the base means 3, line 34 is so moved along the base means 3 until the intersection point 37 of line 34 and the x axis 5 corresponds to the known point size (in points); whereby needle means 17 will intersect arc 9 at a point 26 corresponding to the index number (in degrees) of the 1 cap of a given point size and cap height. Moving line 34 along the x axis 5 at various point sizes (37), will give the various point sizes (37) and corresponding index numbers (26) for a fixed vertical space 38) or cap height (39).

Another use of the present invention, as shown in FIG. 8, is to control the distance between the bottom of one line of caps 29, and the top of the row beneath 28. This distance (27) is commonly known as the "white space".

In order to determine the white space 27, a measurement known is the "linespace" or "leading" need be known or determined. A definition of leading is the distance from baseline to baseline. This vertical distance or leading 32 is illustrated in FIG. 8. The term "leading" refers to the practice in hot type of casting letters on parallel blocks of lead, the height of which determines the aforementioned distance.

The mathematical relationship between the white space (w) 27, cap height (h) 39 or vertical space (38), and leading (l) 32 is stated as $1-h=w$. Therefore, if a two (2) point white space 27 is required, the cap height 39 must be two (2) points less than the intended leading 32. The cap height for a required (known) leading and white space can be determined using the above-mentioned formula.

Once the cap height 39 (for a particular leading and white space) is determined using the $1-h=w$ formula; and the point size 37 is known, the index number 26 is found by the method of the present invention.

This index number 26 would indicate the typeface or typefaces for a given cap height and point size. Using the method of the present invention, if the point size and the cap height are known, the index number can be determined by aligning line 33 at a point 39 which corresponds in value to 2 points less than the leading (1); line 34 is aligned to intersect the x axis 5 at a point corresponding to the point size, the needle 17 will then intersect arc 9 at point 26 corresponding to the index number necessary to produce that white space.

If the index number 26 is known, and the cap height (for a particular leading and white space) is determined using the $1-h=w$ formula, the point size can be determined using the method of the present invention. The needle means 17 is set to intersect arc 9 at point 26 corresponding to the index number of that specific typeface, line 33 of the aligning means 11 is then set to intersect the y axis 7 of the base means 3 at point 39, which is measured at 2 points less than the leading (1); with points 26 and 39 at this setting, the point of intersection 37 of line 34 and the x axis 5 will correspond to point size.

In order to determine the leading, the cap height can be found using the method of the present invention. Thus, if the index number and the point size are known, align the line 34 with the x axis at a point which corresponds with the point size, align needle means 17 with arc 9 so that the intersect point corresponds with the index number, then point 39 will correspond to the cap height and the leading will be measured at 2 points in value greater than this number.

Figure 9:
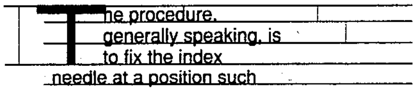
FIG. 9 illustrates the special situation called "dropped caps."

Yet another use of the present invention is to determine the cap height (face size) for a "dropped cap"; wherein the number of lines of text that the cap will cover as well as the index number for the typeface are known. This is illustrated in FIG. 9; wherein the "dropped cap" is the letter "T" which covers three lines. If the text type is already set, follow the method of the present invention for determining the point size if the cap height and the index number are known.

If the type has not been set, and hence there is no possibility of direct measurement, the following method is to be employed. Subtract the number one (1) from the number of lines to be indented. Multiply the intended leading by that number, and add the result to the text face's cap height. The text face's cap height is found by employing the method of the present invention for finding the cap height when the point size and index number are known, as previously described. The result of this addition will be the intended cap height of the dropped cap. Adjust the aligning means 11 so that point 39 reflects the cap height, needle means 17 intersects arc 9 at point 26 corresponding to the index number of the dropped cap's intended typeface. The point size (in points) will then be indicated at x axis intersect point 37 to produce a cap of the intended height in the intended typeface As an example, if the text is Garamond (index 32.6) 9 on 10, and the dropped cap is to be a three-line in Avant Garde Bold (index 36.9), one first determines the text face's cap height by positioning the needle at 32.6 on the arc, and line 34 at 9 on the y axis. Line 33 will then read 5.75 points, which is the text face's cap height. Multiply the leading 10 by 2, which yields 20. Add 5.75, and you have 25.75, which is the cap height necessary to fill the intended space. Now position line 33 a 25.75 and the needle means 11 at 36.9, the index number of the Avant Garde Bold. Line 34 will intersect the x axis 7 at 34.33, which rounds off to 34.5 point, the point size necessary in Avant Grade Bold to produce a cap of height 25.75.

Yet another use of the present invention is to match a sample of type, wherein the first match is accurate. In the present art, an accurate first match is rarely accomplished due to the imprecision inherent in most commonly used methods. Acetate sheets with representative letters necessarily fall short due to the sheer number of typefaces in current use, to represent more than a sampling of possible sizes from 4 to 72 point would necessitate an overwhelming number of such sheets.

The present invention allows for an accurate first match, wherein the device is placed over a sample, the aligning means is so moved so that the needle means intersection point 39 reflects the index number (in degrees), and the point size is immediately available by reading the x axis intersect point coordinates. If the index number is not known, it can be easily determined by using any sample of that typeface for which the size is known, by the methods described above.

While the specific methods of use of the invention have been shown and described in detail, it is appreciated that once the user has a complete list of his index numbers for specific typefaces, a database program can be used to regroup these faces by index number. Most personal computers (PC) database programs will allow a user to sort this data according to at least two criteria, for example, by number and then by typeface name, thus creating a cross-referencing system facility.

The above description of the invention is merely exemplary and the scope of the invention is to be measured by the terms of the following claims and reasonable equivalent thereof.

I claim:

1. A device for determining type size, comprising: a base means, cover means, needle means, and aligning means; said base means and cover means comprising a pair of vertical edges and horizontal edges and further comprising a left and right vertical edge and an upper and lower horizontal edge, said edges being at right angles to each other; said aligning means comprising a horizontal arm and a vertical arm, said arms being at right angles to each other and further comprising an outer edge and inner edge of said horizontal arm and vertical arm, wherein a line is inscribed offset from and parallel to said inner edges; and further, said aligning means is slidably moveable between said base means and cover means; and said needle means is rotatably attached to said base means and cover means by conventional pin means, as well as slidably attached to said aligning means by conventional groove means; whereby the device is laid over a cap to be sized, and, after placement, the device is aligned with said cap so that the base of said cap is aligned with said lower horizontal edge of said base means, wherein present on said lower horizontal edge of said base means is a scale thereon composed of numbers in consecutive order measured in points denoting point size; and the apex of said cap is aligned with the line offset from the inner edge of said horizontal arm of said aligning means, wherein said horizontal arm of said aligning means is perpendicular to said vertical edges of said base means, wherein present on said left vertical edge of the base means is a scale thereon composed of numbers in consecutive order measured in points denoting cap height; wherein said scales of numbers intersect at a vertex point; and further, after said alignment, said vertical arm of said aligning means is moved along said lower horizontal edge of said base means until the line offset from said inner edge of said vertical edge of said aligning means intersects said lower horizontal edge of said base means at a point corresponding to the point size of said cap; and present on said cover means is an arc with a scale inscribed thereon composed of numbers in consecutive order measured in degrees; and further, once said base means, cover means and aligning means of the device are so aligned with said cap, the point of intersection of a line inscribed along the center said needle means with said arc inscribed on said cover means denotes the index number in degrees of the typeface of said cap for the specific point size and cap height of said cap.

2. A device as claimed in claim 1, wherein said lower horizontal edge of said base means corresponds to the x axis, said left vertical edge of said base means corresponds to the y axis, and their intersection corresponds to said vertex.

3. A device as claimed in claim 1, wherein said line parallel to and offset from said inner edges of said aligning means is inscribed offset from said inner edges by 0.0463 inches.

4. A device as claimed in claim 2, wherein the x axes has imposed thereon a scale comprising a consecutive number of one/half intervals of a range from 0 to 210 points; and the y axes has imposed thereon a scale comprising consecutive numbers of one/half intervals of a range from 0 to 210 points.

5. A device as claimed in claim 1, wherein said arc inscribed on said cover means has imposed thereon a scale comprising consecutive numbers corresponding to said index number of the cap of a range from 25–40 degrees.

6. A device as claimed in claim 1, wherein said needle means is attached to said base means and cover means by conventional pin means as close to said vertex as geometrically feasible, wherein said pin means fits though the shaft portion of said needle means.

7. A device as claimed in claim 1, wherein said pin means is molded and protrudes as close to said vertex of said base means and cover means as geometrically feasible and fits through the shaft portion of said needle means.

8. A device as claimed in claim 1, wherein said needle means is slidably connected to said aligning means by conventional groove means, wherein a tab portion of said aligning means located at the intersection of said lines parallel to and offset from the inner edges of said aligning means, slides along the length of said groove portion of said needle means, so as to maintain said needle means at right angles to said arc inscribed on said cover means.

9. A device as claimed in claim 1, wherein said base means, aligning means, needle means and cover means are constructed of clear plastic.

10. A device as claimed in claim 1, wherein said base means has a pattern inscribed thereon of vertical lines one point in distance apart and 0.15 point in thickness in order to maintain a perpendicular relationship between said edges of the base means and said arms of said aligning means.

11. A device as claimed in claim 1, wherein said base means and cover means are comprised of a polarizing material, wherein the maximum polarizing effect can be observed when the edges of said base means and cover means are aligned perpendicular to each other, and the minimum polarizing effect can be observed when said edges are parallel to each other.

12. A device as claimed in claim 1, wherein the base means and cover means are attached at said upper horizontal edge by a panel portion; said panel portion is molded to said base means and cover means to insure a sturdy construction.

13. A device as claimed in claim 1, wherein a conventional loupe of a range of 6 to 8 power is utilized to read the index number in degrees on the arc portion of the cover means.

14. A device as claimed in claim 1, wherein said needle means has a tab portion molded onto the end nearest the vertex, wherein said thickness of said tab portion is equal to said aligning means so as to allow for horizontal alignment of said needle means on said aligning means.

15. A device as claimed in claim 1, wherein said needle means has a solid tip at the end which intersects the arc of said aligning means, and said tab portion of said aligning means abuts against said solid tip.

16. A device as claimed in claim 1, wherein said scales on said base means are inscribed on the surface of said base means in contact with the material on which said cap is printed.

17. A device as claimed in claim 1, wherein said arc on said cover means is inscribed on the surface of the cover means not in contact with said base means.

18. A method for facilitating the determination of type size, comprising the following steps in the sequence set forth:

(a) placing a device, comprising a base means; cover means; aligning means and needle means over a cap; said base means and cover means comprising a pair of vertical edges and horizontal edges and further comprising a left and right vertical edge and an upper and lower horizontal edge, said edges being at right angles to each other; said aligning means comprising a horizontal arm and a vertical arm, each arm further comprising an outer edge and inner edge, said arms being at right angles to each other wherein a line is inscribed offset and parallel to said inner edges;

(b) aligning said base means with said cap, so that the base of the cap is aligned with said lower horizontal edge of the base means, wherein present on said lower horizontal edge of the base means is a scale therein composed of numbers in consecutive order measured in points approximately 1/72 of an inch representing the point size of said cap;

(c) aligning the apex of the cap with the line offset from and parallel to said inner edge of said horizontal arm of said aligning means, wherein said inner horizontal edge of said aligning means is perpendicular to said vertical edges of said base means, and present on the said left vertical edge of said base means is a scale thereon composed of numbers in consecutive order measured in points representing the cap height of said cap;

(d) moving said inner edge of said vertical arm of said aligning means along said lower horizontal edge of said base means until the line offset from and parallel to said inner vertical edge of said aligning means perpendicularly intersects said lower horizontal edge of said base means at a point corresponding to the point size of said cap;

(e) once so aligned, and simultaneously with step (d), the point of intersection of the line inscribed along the center of said needle means with an arc inscribed on said cover means denotes the index number in degrees of the typeface of said cap for the specific point size and cap height of said cap.

19. A method as claimed in claim 18, wherein said lower horizontal edge of said base means corresponds to the x axis, said left vertical edge of said base means corresponds to the y axis, and their intersection corresponds to said vertex.

20. A method as claimed in claim 18, wherein said line offset from and parallel to said inner edges of said aligning means is inscribed offset from said inner edges by 0.0463 inches.

21. A method as claimed in claim 19, wherein the x axes has imposed thereon a scale comprising a consecutive number of one/half intervals of a range from 0 to 210 points; and the y axes has imposed thereon a scale comprising a consecutive number of one/half intervals of a range from 0 to 210 points.

22. A method as claimed in claim 18, wherein said arc inscribed on said cover means has imposed thereon a scale comprising consecutive numbers corresponding to said index number of the cap of a range from 25–49 degrees.

23. A method as claimed in claim 18, wherein said needle means is attached to said base means and cover means by conventional pin means as close to said vertex as geometrically feasible, wherein said pin means fits though the shaft portion of said needle means.

24. A method as claimed in claim 18, wherein said pin means is molded and protrudes as close to said vertex of said base means and cover means as geometrically feasible and fits through the shaft portion of said needle means.

25. A method as claimed in claim 18, wherein said needle means is slidably connected to said aligning means by conventional groove means, wherein a tab portion of said aligning means located at the intersection of said inner edges of said aligning means, slides along the length of said groove portion of said needle means, so as to maintain said needle means at right angles to said arc inscribed on said cover means.

26. A method as claimed in claim 18, wherein said base means, aligning means, needle means and cover means are constructed of clear plastic.

27. A method as claimed in claim 18, wherein said base means has a pattern inscribed thereon of vertical lines one point in distance apart and 0.15 point in thickness in order to maintain a perpendicular relationship between said edges of the base means and said arms of said aligning means.

28. A method as claimed in claim 18, wherein said base means and cover means are comprised of a polarizing material, wherein the maximum polarizing effect can be observed when the edges of said base means and cover means are aligned perpendicular to each other, and the minimum polarizing effect can be observed when said edges are parallel to each other.

29. A method as claimed in claim 18, wherein the base means and cover means are attached at said upper horizontal edge by a panel portion; said panel portion is molded to said base means and cover means to insure a sturdy construction.

30. A method as claimed in claim 18, wherein a conventional loupe of a range of 6 to 8 power is utilized to read the index number in degrees on the arc portion of the cover means.

31. A method as claimed in claim 18, wherein said needle means has a tab portion molded on to the edge which intersects said vertex, wherein said thickness of said tab portion is of equal thickness of said tab portion of said aligning means so as to allow for horizontal alignment of said needle means on said aligning means.

32. A method as claimed in claim 18, wherein said needle means has a solid tip at the end which intersects the arc of said aligning means, and said tab portion of said aligning means abuts against said solid tip.

33. A method as claimed in claim 19, wherein said scales on said base means are inscribed on the surface of said base means in contact with the material on which said cap is printed.

34. A method as claimed in claim 18, wherein said arc on said cover means is inscribed on the surface of the cover means not in contact with said base means.

* * * * *